United States Patent

Spreadbury

[15] 3,659,191

[45] Apr. 25, 1972

[54] REGULATING TRANSFORMER WITH NON-SATURATING INPUT AND OUTPUT REGIONS

[72] Inventor: Robert J. Spreadbury, Murrysville, Pa.

[73] Assignee: Westinghouse Electric Corporation, Pittsburgh, Pa.

[22] Filed: Apr. 23, 1971

[21] Appl. No.: 136,702

[52] U.S. Cl. .................................. 323/51, 323/56, 323/60, 336/170, 336/215
[51] Int. Cl. ......................................... G05f 1/32, G05f 3/06
[58] Field of Search ................ 323/6, 60, 51, 61, 89 AG, 56, 323/90, 44; 336/165, 170, 180, 215

[56] References Cited

UNITED STATES PATENTS

| | | | |
|---|---|---|---|
| 2,694,163 | 11/1954 | Sola | 323/61 X |
| 3,148,326 | 9/1964 | Baycura et al. | 336/165 X |
| 3,260,975 | 7/1966 | Howard | 336/215 X |
| 3,579,088 | 5/1971 | Fletcher et al. | 323/6 |

*Primary Examiner*—A. D. Pellinen
*Attorney*—A. T. Stratton, F. E. Browder and Donald R. Lackey

[57] ABSTRACT

A three-path parametric regulating and filtering transformer having an adjustable output voltage. The regulating transformer includes a magnetic core having input, output and saturable regions, an input winding disposed about the input region, an output winding disposed about the output region, and a capacitor connected to the output winding to provide a tank circuit. In one embodiment, a magnetic element is disposed to influence the magnitude of the voltage across the output winding, with the position of the magnetic element, relative to the output winding, being adjustable. In another embodiment, the output region of the magnetic core is divided into two spaced portions, the output winding is disposed about both portions, and electrical control coils are disposed about each portion and connected in opposition. A unidirectional control current is passed through the control coils, with the magnitude of the unidirectional current controlling the voltage across the output winding.

16 Claims, 10 Drawing Figures

Patented April 25, 1972

REGULATING TRANSFORMER WITH NON-SATURATING INPUT AND OUTPUT REGIONS

BACKGROUND OF THE INVENTION

1. Field of the Invention

The invention relates in general to regulating transformers, and more specifically to regulating transformers of the parametric type.

2. Description of the Prior Art:

Co-pending application Ser. No. 835,953, filed June 24, 1969, now U.S. Pat. No. 3,584,290 which is assigned to the same assignee as the present application, discloses a new and improved parametric regulating and filtering transformer. This new parametric regulating transformer requires a magnetic core having only three paths or regions, only one of which is saturable within the design rating of the transformer. Input and output windings are disposed about the non-saturating regions, and a capacitor is connected to the output winding to provide a tank circuit. While the geometry of the magnetic core may be selected such that a linearizing non-magnetic gap is not required in the region associated with the output winding, in practice such a non-magnetic gap is included as it optimizes the waveform of the output voltage from the standpoint of harmonic content, it makes the operation of the parametric transformer more stable, and it enhances the required decoupling of the input and output windings. The non-magnetic gap also influences the output voltage magnitude, and also the threshold voltage required to start the operation of the transformer, and since it is usually desirable to make the parametric transformer self-starting at the lowest design input voltage, the dimensions of the non-magnetic gap and the cross-sectional areas of the output and saturating regions are all selected to provide this feature.

Regulating transformers are designed to provide a predetermined output voltage, but due to manufacturing tolerances in the magnetic core, windings and capacitors, the transformer usually requires some adjustment during test, with the adjustment being performed on the gap dimension. Once the gap is set and the core banded, there is no user adjustment on the output voltage, except for taps which may have been specified for the output winding.

Since the initial adjustment of the regulating transformer during test is time consuming and therefore costly, and difficult for unskilled personnel to perform, it would be desirable to provide a new and improved three-path parametric regulating transformer which may have its output voltage quickly and easily adjusted to provide a desired output after manufacture. Further, it would be desirable to be able to offer the user the feature of being able to continuously adjust the output voltage within a predetermined range, without resorting to taps on the output winding.

SUMMARY OF THE INVENTION

Briefly, the present invention is a new and improved parametric regulating and filtering transformer which includes a magnetic core having input, output and saturable regions, an input winding disposed about the input region, an output winding disposed about the output region, and a capacitor connected to the output winding to provide a resonant tank circuit. The output region has a linearizing non-magnetic gap therein, but instead of adjusting the gap dimension during test to provide the desired characteristics of the transformer, a magnetic element, such as a stack or packet of metallic magnetic laminations, is disposed to influence the output voltage. Preferably, the packet of laminations is disposed partially within the opening of the output winding. During test of the apparatus after manufacture, the magnetic element may be moved relative to the output winding until the desired output voltage is achieved. If the transformer is not to have a user adjustment, the position of the magnetic element is then fixed. If a user adjustment is required, means is provided to enable the user to easily change the position of the magnetic element relative to the output winding.

In another embodiment, the voltage adjustment is accomplished electrically, instead of mechanically, by dividing the output region into two spaced magnetic members, disposing the output winding around both of the magnetic members, and disposing a control coil about each member. The control coils are connected in series opposition to cancel alternating voltages induced therein and provide substantially no alternating voltage across the two serially connected coils. The two serially connected control coils are connected to an adjustable source of unidirectional voltage, with the magnitude of the unidirectional current flowing through the coils controlling the output voltage developed across the output winding.

BRIEF DESCRIPTION OF THE DRAWINGS

The invention may be better understood, and further advantages and uses thereof more readily apparent, when considered in view of the following detailed description of exemplary embodiments, taken with the accompanying drawing, in which.

DESCRIPTION OF PREFERRED EMBODIMENTS

Figure 1:
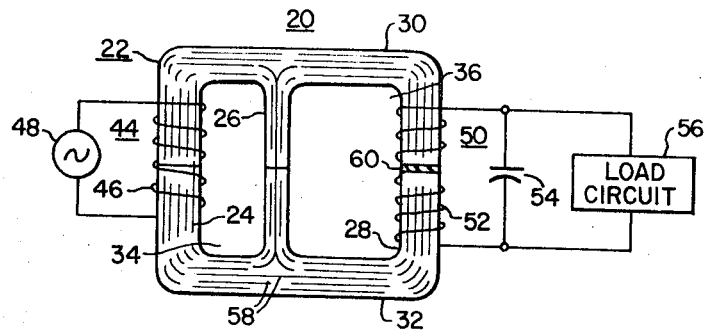
FIG. 1 is a partially schematic view of a parametric regulating and filtering transformer which may utilize the teachings of the invention.

Referring now to the drawings, and FIG. 1 in particular, there is shown a regulating transformer 20 of the core-form type, constructed according to the teachings of the invention. In general, regulating transformer 20 includes a magnetic core 22, having first, second and third parallel connected regions 24, 26, and 28, provided by first, second and third spaced, parallel leg portions, respectively. The adjacent ends of the regions are joined by upper and lower yoke portions 30 and 32, respectively, defining first and second windows or openings 34 and 36, respectively. Thus, the first and third regions 24 and 28 are outer legs of the magnetic core structure 22, and the second region 26 is an inner leg. The first and third regions 24 and 28 are substantially non-saturating input and output regions, respectively, and the second region is a common saturable region.

Magnetic core 22 has first, second and third magnetic loops or paths, with the first magnetic loop encircling the first window 34 via the first or input region 24, a portion of the lower yoke 32, the second or saturable region 26, and a portion of the upper yoke 30. The second magnetic loop encircles the second window 36 via the second or saturable region 26, a portion of the lower yoke 32, the third or output region 28, and the portion of the upper yoke 30. The third magnetic loop encircles both openings 34 and 36 via the first or input region 24, the lower yoke 32, the third or output region 28, and the upper yoke 30.

Means 44, including a primary or input winding 46, and a source 48 of alternating potential, such as 60 hz., are connected to provide a first alternating flux in the first magnetic path, and means 50, including a secondary or output winding 52 and a capacitor 54, is disposed to provide a second alternating flux in the second magnetic loop. Means 50 is a tank circuit, with a load circuit 56 being connected to the output winding.

It is critical for the proper operation of the regulating transformer 20 that the magnetic core 22 be constructed such that the second or common region 26 be saturable at a point less than the vector sum of the first and second alternating fluxes, and that the input and output regions 24 and 28 be substantially non-saturating within the design range of the fluxes which will link them. The input and output windings 46 and 52, respectively, in conjunction with the capacitor 54, automatically insures that the alternating flux in the input and output regions adds substantially in-phase in the common saturable region 26 to saturate the common region during a portion of each half cycle of the alternating flux therein. Finally, the magnetic core 22 is constructed such that the major portion of the flux provided by means 44 will follow the first magnetic loop, while still providing sufficient flux in the third magnetic loop to directly link the input and output windings and induce a voltage in the output winding 52 sufficient to charge capacitor 54 to the point necessary to make the regulating transformer 20 self-starting. However, this requirement of self-starting is for convenience, as a separate starting circuit may be provided to charge capacitor 54 to the magnitude necessary to start and sustain oscillations in the tank circuit.

The common saturating region 26 of magnetic core 22 reaches saturation during each half cycle of the alternating source potential 48, with the flux provided by means 44 adding to the flux provided by tank circuit 50 in region 26 during one half cycle, and then the flux provided by means 44 and 50 both reverse their directions, and they are still additive in the common saturable region 26, but flowing in the opposite direction, to drive region 26 into saturation during this half cycle. In a parametrically pumped ferroresonant oscillator, the output frequency is one half the pumping frequency. The parametric change in regulating transformer 20 is the change of the common region 26 from non-saturation to saturation during each half cycle of the source potential 48. Thus, the pumping frequency is twice the frequency of the source potential 48, and the output frequency is one-half the pumping frequency, or the same as the frequency of the source potential. The value of capacitor 54 is selected such that the tank circuit 50 may be readily tuned to the source frequency.

When source potential 48 is connected to input winding 44, an alternating flux will be produced which divides between the first and third magnetic loops according to their relative reluctances, with the geometry of the core dictating relatively weak direct transformer coupling between the input and output windings 46 and 50 via the third magnetic loop, and a much stronger path through the first magnetic loop. The weak transformer coupling between the input and output windings, however, is unopposed by flux provided by the tank circuit 50 during startup, and thus the regulating transformer may be constructed to induce sufficient voltage into output winding 52 to charge capacitor 54 to the magnitude necessary to sustain oscillations in the tank circuit 50. The threshold voltage necessary to start and sustain oscillations in tank circuit 50 depends, among other things, upon the magnitude of the load across the tank circuit. Once the tank circuit starts to oscillate, its flux in the second magnetic path adds to the flux provided by means 44 in the common saturable region 26, driving region 26 to the knee of its hysteresis curve. Upon reaching saturation, region 26 is no longer a low reluctance path for the flux provided by means 44, forcing the flux provided by means 44 around the third magnetic loop, strongly coupling the input and output windings 46 and 52 and inducing a voltage into the output winding 52 which charges capacitor 54 to provide the energy required to sustain the oscillation of the tank circuit. Region 26 only stays in saturation for a few degrees, typically less than 15, of each half cycle of the source potential, with strong transformer coupling occurring only during this short interval of time. During the remaining portions of each half cycle of the source potential, the input and output windings are effectively isolated. Thus, it will be readily understood that the output voltage waveform is not substantially affected by noise in the input voltage waveform. For a cyclic disturbance, i.e., waveform distortion and/or periodic spikes, the regulating transformer 20 will integrate the overall energy level and provide a filtered stable output voltage. Only a strong random pulse or transient disturbance which occurs precisely at the moment of saturation of the common leg portion would disturb the output voltage waveform, as it is only during this short period that the input and output windings are inductively coupled. Even noise occurring at this precise moment, however, is attenuated, as the short period of direct inductive coupling of the input and output windings occurs at the voltage zero of the tank circuit.

The three leg portions of magnetic core 22 are provided, in this example, by winding magnetic metallic strip material, preferably grain oriented, such as silicon steel, to provide a plurality of nested lamination turns about each window, and then a plurality of additional lamination turns about both windows, such as turns 58, but it is to be understood that it would be equally suitable to provide a magnetic core having a plurality of layers of assembled laminations stacked together, such as E and I laminations in each layer.

The saturating leg is preferably closer to the input leg than the output leg, as the output winding requires a larger window than the input winding. The saturating region may also have a smaller cross sectional area than the other leg portions of the magnetic core, which reduces the threshold voltage required to initiate parametric operation of the transformer.

The output voltage may be optimized, from the standpoint of harmonic content, by placing a non-magnetic gap 60 in the output region 28, which makes the second magnetic loop more linear. Non-magnetic gap 60 may be disposed at any location in the third region 28. The dimensions of the gap 60 are a compromise between harmonic content and power output capability of the regulating transformer, with a dimension of about 20 mils per square inch of cross sectional area of the third or output leg portion providing a good waveform without undue sacrifice in power output capability. The gap 60 in the output region 28 of regulating transformer 20 increases the stability of the transformer, and enhances the decoupling of the input and output windings. Thus, the dimensions of gap 60 may be used to determine the voltage magnitude or threshold voltage required to start the operation of the transformer. In practice, the transformer is made self-starting at the lowest design input voltage by selecting a gap dimension near the preferred 20 mils per square inch of cross sectional area of the output leg, and properly proportioning the cross sectional areas of the output and saturating legs.

In designing a parametric regulating transformer, the relative lengths of the magnetic paths, the cross sectional area of the saturating region relative to the cross sectional areas of the input and output regions, the number of turns in the input and output windings, and the capacitor rating, are all selected to provide the required operating characteristics such as output voltage and threshold voltage for initiating parametric operation, with a non-magnetic gap of about 20 mils per square inch of cross sectional area of the output leg. After the transformers are manufactured, the only parameter which may be economically altered is the dimension of the non-magnetic gap. The normal manufacturing tolerances in manufacturing the core, core material, windings, and capacitor, are such that some gap adjustment may be necessary to obtain the desired output voltage. Using the wound type magnetic core 22 shown in FIG. 1, a magnetic core is wound, the turns are consolidated with binding means, such as an epoxy resin, and then the magnetic core is cut into two substantially equal halves. One cut end of the output leg is machined to provide the desired gap dimension, and the core is reassembled with its windings in position and banded, using a non-magnetic spacer to maintain the gap dimension. Thus, to change the magnetic gap at this stage requires that the band be removed from the core and the transformer disassembled. The present invention discloses how the output voltage of the three path parametric regulating transformer may be adjusted without changing the established gap dimension, and without requiring that the transformer be unbanded and disassembled.

Figure 2:
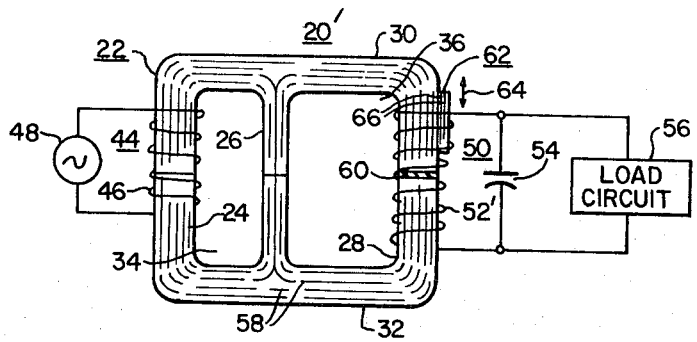
FIG. 2 is a partially schematic view of a parametric regulating and filtering transformer constructed according to the teachings of the invention.

FIG. 2 is a partially schematic view of a parametric regulating transformer 20' constructed according to the teachings of the first embodiment of the invention. Transformer 20' includes a magnetic core and winding assembly, similar to those illustrated in FIG. 1, with like reference numerals in FIGS. 1 and 2 indicating like components. Like reference numerals except for a prime mark in FIG. 2 indicate similar but slightly modified components.

More specifically, transformer 20' includes magnetic means 62 disposed relative to the output winding 52' such that it influences the magnitude of the output voltage across the output winding. The position of the magnetic means 62 is adjustable, as indicated by arrow 64, in order to change its effect on the output voltage. While the magnetic means 62 does not have to actually enter the opening in winding 52' in order to influence the output voltage, it will provide the greatest adjustment on the output voltage, for any selected cross sectional area of the magnetic means, if it is partially disposed within the winding opening and adjustable to change the percentage of its overall length that is disposed within the winding opening.

Magnetic means 62 is preferably formed of a plurality of metallic, magnetic laminations 66, such as the same grain oriented silicon steel of which the magnetic core is constructed, with the laminations being stacked or superposed to provide an integral packet. The laminations 66 may be bonded together with a suitable adhesive, or they may be taped, riveted, or otherwise held in assembled relation. The thickness dimension of the laminations is largely controlled by the output frequency, such as 12 mils for 60 hz. applications, and the width, length and number of laminations in a packet are selected to provide a cross sectional area for the packet which is a predetermined percentage of the cross sectional area of the output leg, with the selected percentage depending upon the adjustment range desired. For example, a parametric regulating transformer rated 1 KVA, and having an output leg with a cross section area of 3.9 square inches, would require a packet having a cross sectional area of about 0.8 square inches for a ±10 percent adjustment from the nominal output voltage.

The magnetic means 64 affects the voltage developed across winding 52', as it, in effect, changes the cross sectional area of the output leg. The closer the magnetic means 62 is to the winding 52', the more the leakage flux is reduced, resulting in more flux linking the output winding. Introducing the magnetic means into the coil opening has the greatest affect on reducing leakage flux, and thus it has the greatest affect on the output voltage. The winding 52 is given a prime mark in FIG. 2, as its opening will be larger than the opening of winding 52 shown in FIG. 1, in order to accept the magnetic means 62.

The cross sectional area of the magnetic means 62 will be a small percentage of the cross sectional area of the output leg, typically in the range of 10 to 15 percent and therefore even if the magnetic means is moved into the winding far enough to bridge the gap 60 it will not adversely affect the operation of the transformer, as the magnetic means will quickly saturate when bridging the gap and therefore not provide a "short" across the gap.

Figure 3:
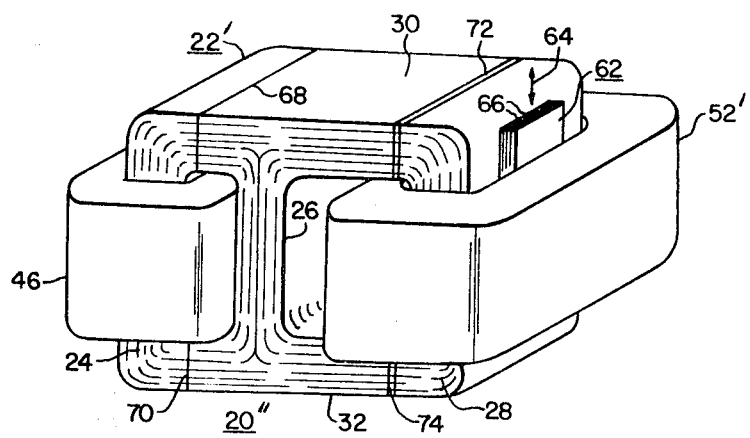
FIG. 3 is a perspective view of a parametric regulating and filtering transformer constructed according to another embodiment of the invention.

FIG. 3 is a perspective view of a parametric regulating transformer 20", similar to the transformer 20' shown in FIG. 2, except having a magnetic core constructed as disclosed in co-pending application Ser. No. 136,701, filed Apr. 23, 1971, which is assigned to the same assignee as the present application, with this construction placing the non-magnetic gap, or gaps, outside the output winding. Like reference numerals in FIGS. 2 and 3 indicate like components.

Instead of cutting the magnetic core after it is wound along a single cut plane perpendicular to the leg portions thereof, as illustrated in FIGS. 1 and 2, the magnetic core is cut along first and second spaced cut planes which intersect the yoke portions of the core perpendicular thereto. The first cut plane provides joints 68 and 70 between the first leg 24 and the upper and lower yoke members 30 and 32, respectively. The second cut plane provides two spaced locations for providing non-magnetic gaps 72 and 74 in the output regions, between the upper and lower yokes 30 and 32 and the output leg 28, respectively. With the magnetic core construction shown in FIG. 3, the packet 62 of magnetic laminations may be moved into and out of the winding 52' without regard to crossing a non-magnetic gap.

The magnetic means 62 provides an adjustment on the output voltage which may be set by the manufacturing test, to provide the required nominal output voltage. If user adjustment is not required on the output voltage, the position of the magnetic means 62 is determined during test and then fixed by any suitable means, such as by a quick setting adhesive. If user adjustment on the output voltage is required, the magnetic means or packet 62 may be disposed such that a simple screwdriver adjustment will change the output voltage continuously within a predetermined range.

Figure 4:
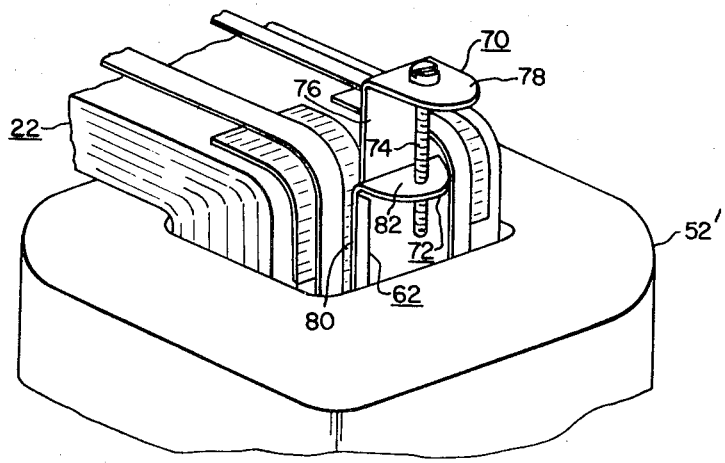
FIG. 4 is a fragmentary, perspective view, illustrating how the embodiment of the invention shown in FIGS. 2 and 3 may be modified to provide a user adjustment on output voltage magnitude.

FIG. 4 is a fragmentary, perspective view of a parametric regulating transformer, such as transformer 20' shown in FIG. 2, illustrating one example of an arrangement for providing user adjustment on the output voltage of the transformer. Like reference numerals in FIGS. 4 and 2 indicate like components. The adjustment comprises a fixed member 70 and a movable member 72, coupled by a threaded bolt 74. The fixed member includes a first portion 76 which extends between the output leg and output winding, and is fixed thereto, and a second portion 78 outside the winding, which is perpendicular to the first portion and which has a threaded opening therein for receiving the bolt 74. The movable member 72 includes a first portion 80 which rests against the first portion 76 of the fixed member, and a second portion 82 which is outside the winding 52', and which is perpendicular to the first portion 80. The second portion 82 has a threaded opening for receiving the bolt 74. The packet 62 of laminations is fixed to the first portion 80 of the movable member 72. Turning bolt 74 in one circumferential direction will cause the packet 62 to move further into the winding 52' and increase the output voltage of the winding. Turning the bolt 74 in the opposite circumferential direction will move the packet such that it advances out of the winding, and will thus decrease the output voltage of the output winding.

FIGS. 5, 6, 7 and 8 illustrate the teachings of the first embodiment of the invention applied to different parametric regulating transformer structures, which structures are disclosed and described in detail in the hereinbefore mentioned co-pending application Ser. No. 136,701. The parametric regulating transformer shown in FIGS. 5, 6, 7 and 8 all utilize a magnetic shunt formed of stacked metallic, magnetic laminations, along with easily constructed magnetic core elements, with the resulting structure facilitating the manufacturing of the transformer and simplifying the gapping of the output region.

Figure 5:
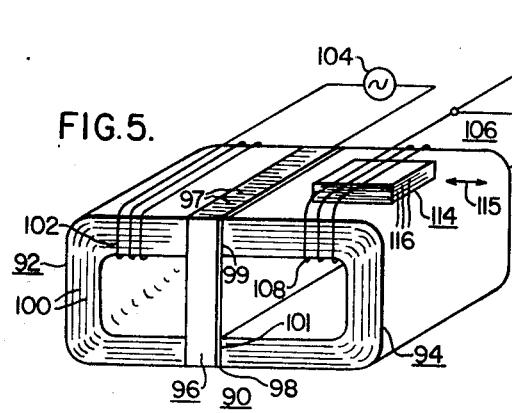
FIG. 5 is a perspective view of a core-form parametric regulating transformer constructed according to the teachings of the invention, using two wound C-cores and a magnetic shunt.

More specifically, FIG. 5 illustrates a parametric transformer 90 formed of first and second wound C-cores 92 and 94, a magnetic shunt 96, and an insulating spacer member 98. C-cores 92 and 94 may be formed by winding metallic, magnetic strip material to provide a predetermined loop having a plurality of nested lamination turns 100, and then the loop is cut to provide the first and second C-cores.

The magnetic shunt 96 is formed of a plurality of stacked laminations 97, which are bonded together or otherwise held in assembled relation. Spacer member 98 is disposed against one of the sides of the magnetic shunt 96 formed by the edges of the lamination 97. An input winding 102 is assembled about the first C-core 92, and the first C-core 92 is butted against the side of shunt 96 which is opposite to the side on which the spacer means 98 is disposed. The input winding 102 is adapted for connection to a source 104 of alternating potential.

An output winding 108 is disposed about the second C-core 94, and the second C-core has its cut ends butted against the spacer member 98, providing first and second non-magnetic gaps 99 and 101 in the output region. A tank circuit 106 is provided by connecting a capacitor 110 to the output winding 108, and a load circuit 112 is connected to the output winding 108.

The first C-core 92 functions as a first magnetic loop, the second C-core 94 functions as a second magnetic loop, the two C-cores together, along with the portions of the magnetic shunt 96 and insulating spacer member 98 disposed between their aligned ends, provides a third magnetic loop. The magnetic shunt 96 is the common or saturating region of the magnetic core structure.

The output voltage of output winding 108 is adjustable by disposed a packet 114 of metallic laminations 116 such that it is partially within the output winding 108. Adjustment of the packet 114 into and out of the winding 108, as illustrated by arrow 115, provides a continuous adjustment on the output voltage within a predetermined range.

Figure 6:
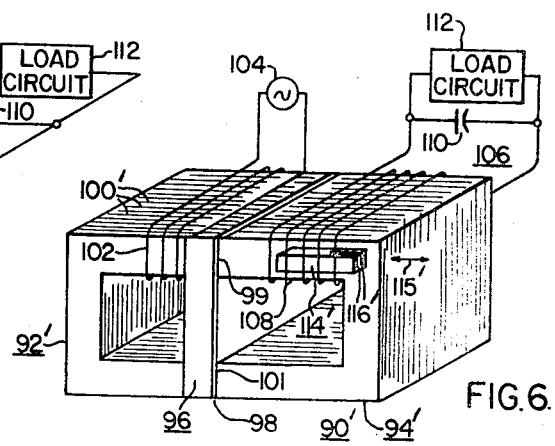
FIG. 6 is a perspective view of a core-form parametric regulating transformer, which is similar to the transformer shown in FIG. 5, except it utilizes two stacked C-cores.

FIG. 6 is a perspective view of a parametric regulating transformer 90', which is similar to the transformer 90 shown in FIG. 5, except it is constructed with C-cores formed of stacked C-shaped laminations, instead of being wound, as shown in FIG. 5. Like reference numerals in FIGS. 5 and 6 indicate like components, with like reference numerals with a prime mark in FIG. 6 indicating similar but slightly modified components.

More specifically, the magnetic core shown in FIG. 6 has first and second C-cores 92' and 94' which are constructed of a plurality of C-shaped laminations, such as laminations 100', which are superposed or stacked with their outer edges aligned, and with the ends of the C-cores being aligned but separated by the magnetic shunt 96 and spacer means 98. A voltage adjusting element 114', in this example, is illustrated as being disposed partially within the output winding 108, but instead of disposing it on the side of the core, it is disposed at the end of the core. Either location is suitable, but since the largest cross sectional area for the magnetic element 114' may be achieved by placing it on the side of the C-core, the embodiment shown in FIG. 5 is preferable.

The parametric regulating and filtering transformers shown in FIGS. 5 and 6 are of the coreform type, but it is to be understood that the invention is equally applicable to parametric regulating and filtering transformer of the shell-form type. For example, FIGS. 7 and 8 illustrate two different types of shell-form construction which may utilize the teachings of the invention.

Figure 7:
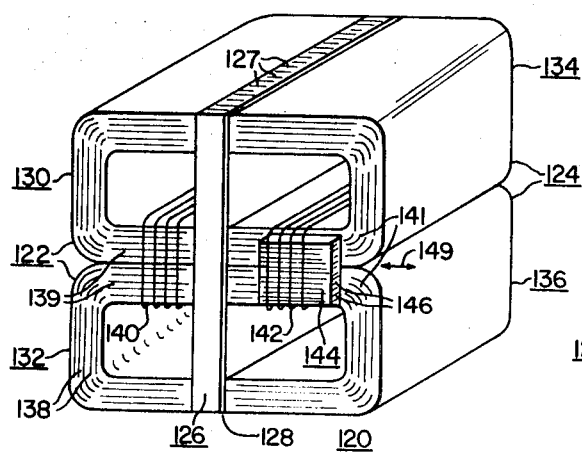
FIG. 7 is a perspective view of a shell-form parametric regulating transformer constructed according to the teachings of the invention, using four C-cores and a magnetic shunt.
Figure 8:
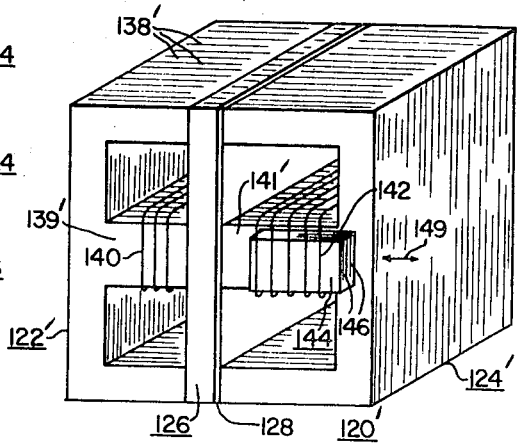
FIG. 8 is a perspective view of a shell-form parametric regulating transformer similar to the transformer shown in FIG. 7, except utilizing two E-shaped magnetic core elements.

More specifically, FIG. 7 illustrates a shell-form parametric regulating transformer 120 having first and second magnetic core elements 122 and 124, a magnetic shunt 126 formed of a plurality of stacked laminations 127, and an insulating spacer member 128 disposed on one side of the magnetic shunt. The first magnetic element 122 includes first and second C-cores 130 and 132 disposed in side-by-side relation, such that the adjoining legs form an input leg 139, and the two C-cores 130 and 132 are disposed with their cut ends abutting tightly against the side of the shunt 126 which is opposite to the side on which the spacer member 128 is disposed. The second magnetic core element includes first and second wound C-cores 134 and 136, which are also disposed side-by-side such that their adjoining leg portions provide an output leg 141. The four C-cores may be formed by winding first and second magnetic loops, providing a plurality of nested lamination turns, such as turns 138, and then the cores may be consolidated and cut to provide the four C-cores required for the transformer 120. An input winding 140, which is adapted for connection to a source of alternating potential (not shown) is disposed about the composite input leg 139, and this assembly is disposed against one side of the magnetic shunt 126, with the cut ends of the C-core butting tightly against the magnetic shunt. An output winding 142 is disposed about the composite leg 141 formed by the C-cores 134 and 136, and this assembly is disposed with the cut ends of the C-cores butting tightly against the spacer member 128, with the spacer member 128 providing three non-magnetic gaps in the output region of the magnetic core. A capacitor and load circuit (not shown) are connected to the output winding 142, as hereinbefore described in other embodiments of the invention. Voltage control on the output winding is provided by a packet 144 of metallic laminations 146, which packet is partially disposed within the opening of the output winding 142. As illustrated in FIG. 7, the packet 144 is disposed at the end of the output leg 141, bridging the side-by-side leg portions of the magnetic cores 134 and 136.

In the operation of the shell-form parametric regulating transformer 120, the composite leg 139 is the input region or leg of the magnetic core structure, the composite leg 141 is the output region or leg of the magnetic core structure, and the magnetic shunt 126 is the saturable common region of the magnetic core. As hereinbefore described relative to the other embodiments of the invention, the magnetic element 144 is adjustable into and out of the winding 142, as illustrated by the arrow 149.

The wound type magnetic core structure using four wound C-cores, as shown in FIG. 7, efficiently utilizes the iron of the magnetic core as the input and output legs 139 and 141 are twice as wide as the remaining legs of the C-cores. Since input and output regions will have twice the flux, all of the iron in the magnetic core structure has the same flux density. However, it would be also suitable to provide a wound type magnetic core for shell-form construction by constructing a wound type magnetic core such as the magnetic core 22 shown in FIG. 1, and cutting the magnetic core along a cut plane which intersects the three leg portions of the core. In this instance, the two cut portions of the inner leg would function as the input and output legs of the shell-form construction, but the input and output legs would have about the same cross sectional area as the remaining legs of the magnetic core, resulting in the remaining legs being worked at a lower flux density than the input and output regions of the core.

FIG. 8 is a perspective view of a parametric regulating transformer 120' which is similar to the parametric transformer 120 shown in FIG. 7, except it is constructed with flat, stacked laminations, instead of being wound. Like reference numerals in FIGS. 7 and 8 indicate like components. Each core element 122' and 124' of the parametric regulating transformer 120' shown in FIG. 8, include a plurality of substantially E-shaped laminations 138', which are stacked or superposed with their outer edges aligned. Like reference numerals in FIGS. 7 and 8 indicate like components, and like reference numerals except for a prime mark in FIG. 8 indicate like but modified components.

In order for the parametric transformer 120' to be a functional equivalent of the transformer 120 shown in FIG. 7, the middle or intermediate leg portion of the E-shaped lamination should be twice as wide as the outer leg portions. If all of the legs of the E-shaped laminations were to be constructed with the same width dimension, the resulting parametric regulating transformer would be a functional equivalent to using two halves of a wound type core which has three leg portions, such as the magnetic core illustrated in FIG. 1.

Figure 9:
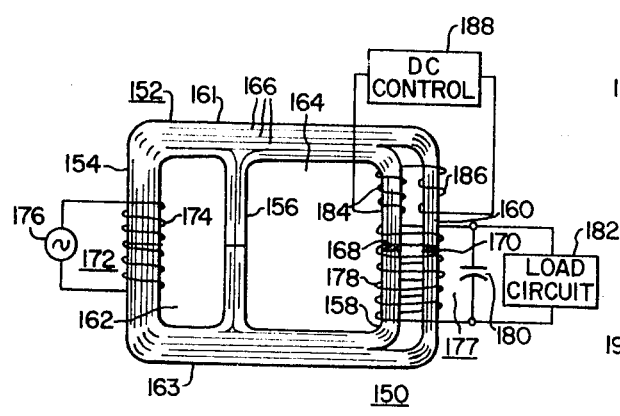
FIG. 9 is a partially schematic view of a core-form parametric regulating transformer, which obtains output voltage control electrically.
Figure 10:
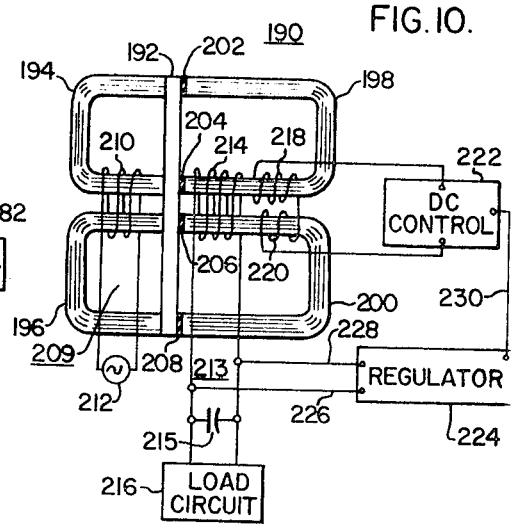
FIG. 10 is a partially schematic view of a shell-form parametric regulating transformer which obtains output voltage control electrically.

The parametric regulating transformers disclosed and described up to this point, have all utilized mechanical adjustment for providing control over the output voltage of the regulating transformer. FIGS. 9 and 10 are partially schematic views of parametric regulating and filtering transformers which illustrate an embodiment of the invention wherein output voltage control is accomplished electrically.

More specifically, FIG. 9 illustrates a core-form parametric regulating and filtering transformer 150 which, for purposes of example, is illustrated with a wound type magnetic core 152 having first, second, third and fourth leg portions 154, 156, 158 and 160, respectively, disposed in spaced parallel relation, with their adjacent ends being interconnected by upper and lower yoke portions 161 and 163, respectively. Magnetic core 152 is wound of magnetic, metallic strip material to provide a plurality of nested lamination turns, such as turns 166, defining two major windows 162 and 164. The first leg portion 154 functions as the input region of the magnetic core, and the second leg portion 156 functions as the common or saturating region of the magnetic core. The third and fourth leg portions 158 and 160 both function as the output region of the magnetic core and each have a non-magnetic gap therein, such as gaps 168 and 170, respectively. The input region includes means 172 for providing a first alternating flux in the magnetic core 152, which means includes an input winding 174 and a source 176 of alternating potential. An output winding 178 is disposed to encircle both of the magnetic elements or legs 158 and 160 of the output region, and a capacitor 180 is connected to the output winding 178 to provide a tank circuit 177. A load circuit 182 is connected to the output winding.

The output voltage of winding 178 is controlled by disposing an electrical control coil about each magnetic element, with a control coil 184 being disposed about magnetic element 158, and a control coil 186 being disposed about magnetic element 160. The two control coils 184 and 186 are wound about the magnetic elements and connected such that substantially no alternating voltage appears across the ends of the two serially connected coils. In other words, the two serially connected coils are connected in opposition, such that the alternating voltages induced into the coils are of opposite polarity at any instance. The ends of the serially connected control coils 184 and 186 are connected to an adjustable source of unidirectional voltage, illustrated by the d.c. control means 188.

Connecting the first and second control coils 184 and 186 in series opposition to cancel alternating voltages induced therein, will cause the control flux to be directed in opposite directions through the magnetic elements 158 and 160. Each control coil, however, provides active control during each half cycle of the output potential, as in any selected half cycle the direct current flux will cancel alternating flux in one magnetic element, and in the other magnetic element it will increase the reluctance of the leg, and control the amount of alternating flux which will flow therethrough. The control on the magnitude of the output voltage may be open ended, whereby the magnitude of the direct current flowing through the control coil is adjusted to a predetermined magnitude to provide a predetermined output voltage, or it may be part of a closed loop regulator system, such as disclosed relative to FIG. 10.

FIG. 10 illustrates a partially schematic view of a parametric regulating and filtering transformer 190, which has electrical control over the output voltage of the output winding, similar to that disclosed in FIG. 9, except the parametric transformer 190 is of shell-form construction, instead of the core-form construction shown in FIG. 9.

More specifically, the parametric transformer 190 includes a magnetic shunt 192, formed of a plurality of stacked metallic, magnetic laminations, with two wound type C-cores 194 and 196 disposed on one side of the magnetic element 192, and the two wound type C-cores 198 and 200 disposed on the other side of the magnetic shunt, and spaced therefrom by non-magnetic spacer elements 202, 204, 206 and 208.

Means 209, including an input winding 210 and a source 212 of alternating potential, are disposed to provide a first alternating flux in transformer 190, with the input winding 210 being disposed about an input region formed by the adjoining legs of the C-cores 194 and 196.

The C-cores 198 and 200 are disposed on the opposite side of the magnetic shunt 192, compared with the location of C-cores 194 and 196, but instead of being disposed with their adjoining leg portions butted tightly together, as illustrated in the shell-form construction shown in FIG. 7, the adjoining legs are spaced apart by a predetermined dimension. An output winding 214 it disposed about the adjoining but spaced leg portions of the C-cores 198 and 200, with a capacitor 215 being connected to the output winding 214 to provide a tank circuit 213. A load circuit 216 is connected to the output winding 214.

Voltage control is provided over the output voltage of the winding 214, by disposing a first control coil 218 about C-core 198, and a second control coil 220 about C-core 200. The coils are wound and connected such that the instantaneous polarities of alternating voltages induced therein will cancel, providing substantially no alternating voltage across the two serially connected coils. The ends of the serially connected coils are connected to a d.c. control circuit 22, which provides an adjustable direct current voltage to the series circuit. The voltage control may be open ended, as illustrated in FIG. 9, or it may be a closed loop type control including a regulator 224 connected via conductors 226 and 228 to sense an electrical parameter of the transformer 190, such as the output voltage. The regulator compares the output voltage with a desired value, with any deviation creating an error signal which is applied to the d.c. control 222 via conductor 230. The error signal changes the magnitude of the direct current flowing through the control coils 218 and 220, to return the output voltage to the desired magnitude.

While the magnetic cores shown in the embodiment of the invention illustrated in FIGS. 9 and 10 are of the wound type construction, it is to be understood that the electrical control embodiment of the invention is equally applicable to magnetic core elements constructed of stacked layers of metallic, magnetic laminations.

In summary, there has been disclosed new and improved parametric regulating and filtering transformers with means for quickly and easily adjusting the output voltage of the transformer, without requiring taps on the output winding. In a first embodiment of the invention, the adjustment is mechanical, including a packet of magnetic, metallic laminations disposed such that the packet influences the output voltage of the transformer, with movement of the packet, relative to the output winding, changing its influence on the output voltage. The change in output voltage provided by this mode does not adversely affect other characteristics of the parametric transformer, as the output region, which is associated with the output winding and the voltage adjusting means, is not the saturating region of the transformer. In the conventional type of ferroresonant voltage regulating transformer, the output leg is the saturating leg, and modification of the output leg in an attempt to provide voltage control would adversely affect the characteristics of the transformer. The mechanical adjustment is suitable for either a manufacturing adjustment to set the output voltage during test of the apparatus, as a user adjustment to adjust the output voltage of the transformer within a predetermined range, or for both. Substantially continuous adjustment is provided by the voltage adjusting means disclosed, on both sides of the nominal output voltage, with a ±10 percent adjustment being easily achievable.

In a second embodiment of the invention, the voltage control is electrical. The output region of the magnetic core of the parametric transformer is split or divided and serially connected control coils are disposed on the resulting two magnetic elements. The control coils are connected in series opposition, such that induced alternating voltages cancel across the serially connected coils. The opposing connection of the two coils, however, does not result in one coil providing no voltage control. A controllable direct current flowing through the two serially connected coils results, for any half cycle of alternating flux, in one control coil cancelling alternating flux in its associated leg, and the other control coil adding parallel flux of like direction to the alternating flux, and therefore controlling the reluctance of the leg and the amount of alternating flux which the leg can utilize as a magnetic path.

I claim as my invention:

1. A regulating transformer, comprising:

a magnetic core having first, second and third regions, means interconnecting said first, second and third regions to provide closed magnetic paths, means including an input winding providing a first alternating flux in said first region, means including an output winding and a capacitor connected in parallel to provide a resonant tank circuit, providing a second alternating flux in said third region, magnetic means disposed relative to said output winding such that it influences the magnitude of the voltage across said output winding, means for adjusting the position of said magnetic means relative to said output winding, to change the effect of said magnetic means on the voltage across said output winding, and means including output terminals, connected to provide an output voltage responsive to the voltage across said output winding, said magnetic core being constructed and dimensioned to cause said first and second alternating fluxes to add in said second region, and to saturate said second region during a portion of each half cycle of said second alternating flux, said first and third regions being substantially non-saturating, said second region shunting the major portion of said first alternating flux away from said output winding when said second region is unsaturated, the saturation of said second region forcing the major portion of a further increase in said first alternating flux to link said output winding, transferring energy into said tank circuit to sustain the oscillation thereof.

2. The regulating transformer of claim 1 wherein the third region includes a linearizing non-magnetic gap therein.

3. The regulating transformer of claim 1 wherein the magnetic means is disposed at least partially within the output winding.

4. The regulating transformer of claim 1 wherein the magnetic means includes a plurality of metallic, magnetic laminations superposed to provide a stack of laminations.

5. The regulating transformer of claim 1 wherein the magnetic core is constructed of stacked metallic laminations.

6. The regulating transformer of claim 1 wherein the magnetic core is constructed of a plurality of nested, metallic magnetic lamination turns.

7. The regulating transformer of claim 1 wherein the first and third regions extend perpendicularly outward from opposite sides of the second region.

8. The regulating transformer of claim 1 wherein the magnetic core is of shell-form construction, including a first member which forms the second region, and second and third members which extend perpendicularly outward from opposite sides of said first member to form the first and third regions, respectively.

9. The regulating transformer of claim 1 wherein the magnetic core is of core-form construction, including first, second and third spaced, parallel leg members which form the first, second and third regions of the magnetic core.

10. A regulating transformer, comprising:

a magnetic core including only first, second and third magnetic paths, said first and second magnetic paths having a single leg portion common to both, said first and second magnetic paths being substantially non-saturating except for their common leg portion, said third path including the non-saturating portions of said first and second magnetic paths, means including an input winding providing an alternating flux in the first magnetic path, means including an output winding and a capacitor providing an alternating flux in the second magnetic path which adds to the alternating flux of the first magnetic path in said common leg portion, driving said common leg portion into saturation during each half cycle of the alternating flux in the first magnetic path, to efficiently couple the input and output windings through the third magnetic path only during this time, said output winding and capacitor being connected in parallel to provide a tank circuit which oscillates at a predetermined frequency and provides a stable voltage across said output winding, with the energy for sustaining the oscillation of the tank circuit being transferred from the input winding when the common leg portion saturates, magnetic means disposed relative to said output winding such that it influences the magnitude of the voltage across said output winding, means for adjusting the position of said magnetic means relative to said output winding, to change the effect of said magnetic means and the voltage across said output winding, and means including output terminals connected to provide an output voltage responsive to the stable voltage across said output winding.

11. A regulating transformer, comprising:

a magnetic core having first, second and third regions, means interconnecting said first, second and third regions to provide closed magnetic paths, said third region including first and second spaced magnetic members, means including an input winding providing a first alternating flux in said first region, said second region shunting the major portion of said first alternating flux away from said output winding when said second region is unsaturated, means including an output winding and a capacitor connected to provide a tank circuit, said tank circuit providing alternating flux in said third region which adds to the first alternating flux in the second region, driving said second region into saturation during each half cycle of the first alternating flux, to efficiently couple the input and output windings only during this portion of each half cycle, means including output terminals connected to provide an output voltage responsive to the voltage across said output winding, first and second coils disposed about the first and second magnetic members, respectively, of said third region, said first and second coils being serially connected in opposition to provide substantially no alternating voltage across the two serially connected coils, and unidirectional voltage means connected across the first and second serially connected coils, providing a controllable magnitude of direct current through the coils which controls the magnitude of the alternating voltage produced across said output winding.

12. The regulating transformer of claim 11 including means providing an error signal responsive to the deviation of a predetermined electrical quantity of the regulating transformer from a desired magnitude, with the unidirectional voltage means being responsive to said error signal, controlling the magnitude of the direct current flowing through the first and second coils in response to the magnitude of said error signal.

13. The regulating transformer of claim 11 wherein the magnetic core includes first, second, third and fourth spaced, parallel leg members, with the first and second leg members functioning as the first and second regions, respectively, and the third and fourth leg members functioning as the first and second spaced magnetic members of the third region.

14. The regulating transformer of claim 13 wherein the third region has linearizing non-magnetic gaps in the first and second spaced magnetic members.

15. The regulating transformer of claim 11 wherein the first and third regions of the magnetic core extend perpendicularly outward from the second region.

16. The regulating transformer of claim 14 wherein the third region has linearizing non-magnetic gaps in the first and second spaced magnetic members.

* * * * *